3,623,379
RACK AND PINION ASSEMBLY
Kenneth Bradshaw, Clifton, and James Ernest Buckingham, Hitchin, England, assignors to Cam Gears Limited, Hitchin, England
Filed Aug. 26, 1969, Ser. No. 853,054
Claims priority, application Great Britain, Sept. 20, 1968, 44,735/68
Int. Cl. B62d 1/20
U.S. Cl. 74—498                                                                    5 Claims

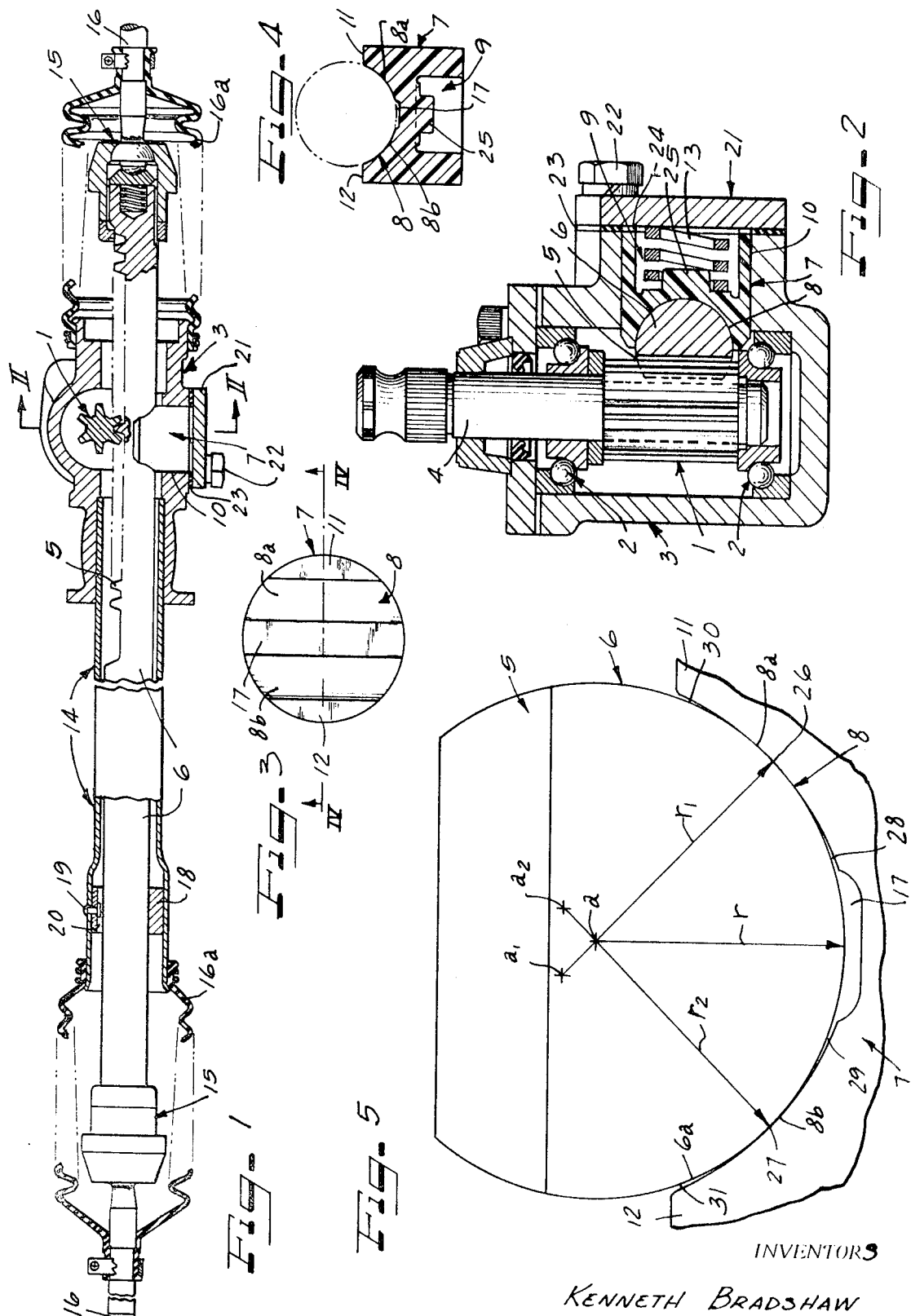

ABSTRACT OF THE DISCLOSURE

A rack and pinion assembly for automotive steering gear having a cylindrical rack bar supported laterally and opposite the pinion by a spring urged yoke formed of low friction, semi-rigid plastics material. The yoke has two concave rack bar seats or bearing surfaces. Each seat is fragmental-cylindrical in shape, has a larger radius than the radius of the cylindrical rack bar and a separate axis disposed laterally from the rack bar axis. The seats are separated by a grease or oil passage in the concave bottom of the yoke. The greater radii and separate axes for the seats accommodate wide tolerance variations, wear, and insure adequate lubrication of the supporting seat areas.

BACKGROUND OF THE INVENTION

Field of the invention

This invention relates to the art of rack and pinion assemblies, especially for automotive steering gear, and particularly deals with the supporting of the rack bar opposite the pinion and laterally by a spring urged yoke of a rigid, but somewhat resilient, plastics material which will dampen shock forces, maintain the rack and pinion in good meshed relation, and provide non-binding, adequately lubricated bearing surfaces for slidably supporting the rack bar.

Description of the prior art

It has been proposed in the prior art, for example in British Pat. 892,683, published Mar. 28, 1962, to provide a rubber block for resiliently supporting a rack bar at its zone of mesh with the pinion in a rack and pinion type of steering gear. Rubber being free-flowing, accommodated excessive rocking of the rack bar and binding of the rack bar against free sliding movement in response to the pinion drive.

SUMMARY OF THE INVENTION

The present invention now provides a supporting yoke of a semi-rigid plastics material for rack bars of rack and pinion assemblies wherein free sliding of the rack bar is maintained, wide tolerance variations are accepted, and automatic wear take-up is provided. The plastics material yokes, although somewhat resilient, do not yield or flow like rubber, and will always provide a firm, low-friction bearing support for the rack bar. These plastics material yokes are spring-urged toward the pinion and have a range of movement which will automatically compensate for any wear so that the rack and pinion teeth are always maintained in good meshed relation. The range of movement of the yokes away from the rack bar is limited so that the yokes will provide unyielding rack bar supports, preventing unmeshing of the rack and pinion teeth.

The bearing surfaces of the yokes are so arranged as to prevent any wedging or binding against the rack bar. The portion of the rack bar received in the yoke is cylindrical, and the yoke has two fragmental cylindrical bearing seats straddling the rack bar and of larger radius than the rack bar so that localized bearing contact with the rack bar will occur on both sides of the rack bar in the quadrants thereof opposite the rack. The larger arcs of the bearing seats permit the rack bar to find its own nesting depth in the yoke, thus accommodating wide tolerance variations. Binding will not occur because, in effect, the contacts between the rack bar and the yoke will be line or narrow band contacts.

The yoke has a grease groove between the bearing surfaces thereof for maintaining adequate lubrication of the line or band supporting surfaces.

The plastics material forming the yoke is a semi-rigid, low-friction material, preferably composed of "Arnite" (a trademark of Algemene Kunstzijde Unie N.V. for polyester resins containing the compound polyethylene terephthalate, known in the art as "P.E.T.P."). Other suitable semi-rigid plastics materials are nylon, polyurethane, "Delrin" (a Du Pont de Nemours trademark for acetal resin derived by polymerization of formaldehyde), and the like. All of these plastics materials are distinguished from rubber in that they are not free-flowing, but they do have some degree of resiliency. These plastics materials possess a very low co-efficient of friction for metal and provide wear-resisting, low-friction bearing surfaces for metal even when not lubricated.

In order that the contact areas between the bearing seats of the yokes and the rack bar will be between the top and bottom ends of the bearing seats, and preferably between the four to five o'clock position on one side and the seven to eight o'clock position on the other side of the bottom half of the rack bar, the axes for the radii of the seats are displaced laterally from the rack bar axis.

The yoke has a recess in the end thereof remote from the bearing face end, and a coiled spring is provided in this recess to urge the yoke toward the rack bar. The yoke is preferably cylindrical and is slidably supported in a cylindrical chamber of the pinion housing. The height of the yoke is such that it will bottom on the cover plate of the pinion chamber before it can move sufficiently away from the pinion as to allow separation of the rack and pinion teeth.

It is then an object of this invention to provide a rack and pinion assembly for automotive steering gear with a supporting yoke for the rack bar at its zone of mesh with the pinion composed of a semi-rigid low-friction plastics material.

Another object of this invention is to provide rack and pinion assemblies with rack bar bearing yokes composed of plastics material spring-urged toward the pinion to provide both lateral and longitudinal support for the rack bar.

Another object of this invention is to provide a rack and pinion assembly having a cylindrical rack bar with a low-friction, semi-rigid plastics material rack bar supporting yoke having concave bearing surfaces for the rack bar shaped to engage the rack bar on opposite sides of the face thereof remote from the pinion so that the rack bar may find its own nesting depth in the yoke without binding.

Another object of this invention is to provide a plastics material yoke for supporting the cylindrical rack bar of a rack and pinion assembly which is slidably mounted in the pinion housing, spring-urged against the rack bar, and firmly bottomed in the housing before the rack and pinion teeth can become disengaged.

A specific object of the invention is to provide a semi-rigid, low-friction plastics material bearing unit for rack bars which has a concave rack bar receiving recess with a grease groove through the bottom thereof and fragmental spherical bearing walls of larger radius than the rack bar, and each having a separate axis laterally displaced from the rack bar axis.

Other and further objects, features and advantages of this invention will be readily apparent from the following description of the preferred embodiment thereof, taken in conjunction with the accompanying drawing, although variations and modifications may be effected without departing from the spirit and scope of the novel concepts of the disclosure.

BRIEF DESCRIPTION OF THE DRAWING

FIG. 1 is a longitudinal cross-sectional view, with parts in elevation, and with the central portion broken away, of a steering gear including a rack and pinion assembly having a plastics material yoke, according to this invention;

FIG. 2 is a transverse cross-sectional view taken along the line II—II of FIG. 1;

FIG. 3 is a top plan view of the plastics material yoke of this invention;

FIG. 4 is a cross-sectional view of the yoke taken along the line IV—IV of FIG. 3;

FIG. 5 is a greatly-enlarged fragmentary view of the bearing seats of the yoke and the rack bar surface seated therein comparing the radii and axes of the seats and rack bar.

DESCRIPTION OF THE PREFERRED EMBODIMENT

In the rack and pinion assembly of FIGS. 1 and 2 a pinion 1 is rotatably mounted on two sets of roller bearings 2 in a pinion housing 3.

The pinion 1 is adapted to be rotatably driven through a shaft 4 and engages with a rack 5 of a substantially cylindrical rack bar 6 so that rotation of the pinion effects a linear movement of the rack bar in a longitudinal direction through the pinion housing 3.

Mounted in the pinion housing 3 and located between the rack bar 6 on the side thereof remote from the rack 5 is a yoke 7 of semi-rigid, but somewhat resilient plastics material such as that sold under the trademark "Arnite" described above. The yoke 7 is provided with a longitudinally-extending part cylindrical recess 8. The yoke 7 is provided with a recess or spring housing cavity 9, and is slidably mounted in a cylindrical chamber 10 of the pinion housing 3 so that it is retained by the housing 3 from transverse movement, but can exhibit sliding movement through the chamber toward and from the rack bar 6.

The part cylindrical recess 8 is of complementary form to the cylindrical rack bar 6. The yoke 7 is slidable through the chamber 10 so that the recess 8 cooperates with the rack bar and side parts 11 and 12 of the yoke, and the rack bar is longitudinally slidable through the recess 8. Located in the housing cavity 9 of the yoke 7 is a helical spring 13 which biases the yoke through the chamber 10 to engage the rack bar in the recess 8.

In FIG. 1, the rack bar 6 is shown as extending from the pinion housing 3 in one direction through a rack bar tubular housing 14 secured at one end in the pinion housing 3. The ends of the rack bar 6 are connected through universal couplings, such as ball joints, 15 to tie rods 16 of the steering linkage. Bellows 16a are provided between each tie rod 16, and, on one side, to the rack bar housing 14, and, on the other side, to the pinion housing 3.

The bellows 16a, the pinion housing 3, and the rack bar housing 14 together effectively form a sealed chamber in which the rack bar 6 is longitudinally movable. This chamber is filled with oil or grease which flows between the bellows 16a during operation of the steering gear, and the yoke 7 has a grease passage 17 at the bottom of the recess 8 to facilitate such grease flow.

The rack bar 6 at the end thereof remote from the pinion housing 3 is slidably supported in a cylindrical bearing 18 secured to the housing 14 by a rivet 19 and having a grease passage 20 therethrough. This bearing 18 may be composed of metal or plastics material.

The chamber 10 of the pinion housing 3 is closed by a plate 21 secured to the housing 3 as by means of bolts 22. Shims 23 may be interposed between the plate 21 and the open end of the chamber 10 so that a desired load will be placed on the spring 13, and also so that a small gap 24 will be provided between the bottom of the yoke 7 and the plate when the spring 13 urges the yoke into its full seated engagement with the rack bar 6. This small gap 24 will accommodate some movement of the yoke away from the opinion, as when shock forces and loads tend to move the rack bar away from the pinion. However, the gap is of smaller extent than the depth of the mating teeth of the rack 5 and pinion 1 so that the yoke 7 will be bottomed on the plate 21 before the teeth can be separated. The yoke 7, therefore, has limited movement in the direction away from the rack bar, but unlimited movement except as controlled by the rack bar, in the direction toward the pinion. As shown in FIG. 4, the yoke 7 has a pilot portion 25 depending into the spring chamber 9. This portion 25 will be encircled by the end coil of the spring 13 and will serve to center the spring in the chamber 9.

As shown in FIGS. 3 and 4, the recess 8 has two bearing portions 8a on the side 11 thereof and 8b on the side 12 thereof. These bearing portions are separated by the grease groove 17 in the bottom of the recess.

As best shown in the enlarged fragmentary view of FIG. 5, the rack bar 6 has its cylindrical bottom half portion 6a in the recess 8. This cylindrical portion 6a has a radius $r$ struck from the longitudinal central axis $a$ of the rack bar. However, the bearing surfaces 8a and 8b have flatter arcs, being struck from longer radii $r_1$ and $r_2$. The radius $r_1$ has an axis $a_1$ disposed laterally from the axis $a$ of the rack bar 6 on the side of the axis remote from the surface 8a. Likewise, the radius $r_2$ is swung from an axis $a_2$ disposed laterally on the side of the axis $a$ away from the bearing surface 8b. Because of the flatter arcs of the bearing surfaces 8a and 8b, than the cylindrical bottom wall 6a of the rack bar 6, the rack bar will mate with the bearing surfaces 8a and 8b only along a line or narrow band of contact area illustrated at 26 for the bearing surface 8a and at 27 for the bearing surface 8b. Because the centers $a_1$ and $a_2$ are shifted laterally from the axis $a$, these contact lines 26 and 27 will occur about midway between the tops and bottoms of the surfaces 8a and 8b, or at about the four to five o'clock position for the surface 8a and the seven to eight o'clock position for the surface 8b. Clearance gaps 28 between the line contact 26 and the recess 17, and 29 between the line contact 27 and the recess 17 will be provided to flow grease or oil from this recess to the contact areas 26 and 27. Similar gaps 30 will occur between the line contact 26 and the side 11 of the yoke, and 31 between the contact 27 and the side 12 of the yoke.

From FIG. 5 it will be appreciated that a wide variation between the size of the cylindrical portion 6a of the rack bar 6 and the recess 8 of the yoke 7 may be tolerated without binding the rack bar. Thus, an oversized rack bar will seat in the recess 8 at a higher level than shown in FIG. 5, an undersized rack bar will seat at a lower level, and wear can be accommodated wherever the seating may occur without binding the rack bar. When wear does occur the contact lines 26 and 27 will widen, and greater surface contact will result to resist further wear.

The low-friction, rigid, but somewhat resilient plastics material used for the yoke 7 provides a firm but yet yieldable bearing support for the rack bar for further accommodating irregularities and wide manufacturing tolerances. Therefore, the rack bar is firmly yet freely slidably supported at its zone of mesh with the pinion. The spring will urge the yoke toward the pinion to take up any wear between the rack and pinion teeth, and the yoke will prevent the rack from climbing out of meshed engagement with the pinion teeth.

We claim as our invention:

1. A vehicle steering gear linkage of the rack and pinion type which comprises a rack and pinion housing, a pinion rotatably mounted in the housing, a cylindrical rack bar slidable through the housing, a rack on said rack bar meshed with said pinion in the housing, a tube projecting from one end of the housing receiving the rack bar therethrough, tie rods coupled to the ends of the rack bar beyond the tube and housing respectively, separate bellows embracing ends of the rack bar projecting from the tube and housing respectively secured to the adjacent tube and housing and to the adjacent tie rod, a bearing secured in said tube remote from said housing slidably supporting the rack bar, said bearing having a lubricant passage therethrough, a yoke formed of a semi-rigid, low-friction plastics material slidably mounted in the pinion housing at the zone of mesh between the pinion and rack having a fragmental cylindrical recess slidably supporting the cylindrical rack bar on the side thereof opposite the pinion and straddling the rack bar on both lateral sides thereof, a spring urging said yoke against the rack bar, said recess of the yoke having a lubricant passage through the bottom thereof, and bearing walls on each side of said lubricant passage, each bearing wall having a longer radius than the cylindrical rack bar with an axis laterally spaced beyond the axis of the rack bar providing substantially line contact engagement with the rack bar to accommodate wide variations in sizes of the recess and rack bar without binding free sliding movement of the rack bar, and said lubricant passages through the bearing and through the yoke accommodating free flow of lubricant throughout the linkage under the pumping action of the bellows as the rack bar is shifted longitudinally by the pinion.

2. A rack and pinion assembly comprising a pinion housing, a pinion rotatably mounted in the housing, a cylindrical rack bar slidable through the housing having a rack in meshed engagement with the pinion, a plastics material yoke slidably mounted in the housing on the side thereof opposite the pinion in the zone of meshed engagement with the rack, said yoke having a fragmental cylindrical recess receiving the cylindrical rack bar freely therethrough, spring means urging the yoke toward the pinion, said cylindrical recess of the yoke having a lubricant passage through the bottom thereof, separate bearing walls in said recess receiving the rack bar in line contact engagement therewith, said walls being of larger radius than the radius of the cylindrical portion of the rack bar, and each wall having a separate axis laterally displaced beyond the axis of the rack bar.

3. The steering gear linkage of claim 1 wherein the plastics material yoke is a cylindrical plug having a spring chamber in one end thereof and the cylindrical bearing recess in the other end thereof.

4. The rack and pinion assembly of claim 2 wherein the yoke is a cylindrical plug.

5. The assembly of claim 2 wherein the bearing walls of the recess receive the rack bar in line contact engagement about midway between the passage and the open top of the recess.

References Cited

UNITED STATES PATENTS

| 2,462,659 | 2/1949 | Molotzak | 184—5 X |
| 3,157,061 | 11/1964 | Parker | 74—498 |

FOREIGN PATENTS

| 946,501 | 1/1964 | Great Britain | 74—498 |

OTHER REFERENCES

German printed application—1,075,959—Alford et al.—Feb. 18, 1960.

MILTON KAUFMAN, Primary Examiner

U.S. Cl. X.R.

74—422